United States Patent [19]

Crosby et al.

[11] Patent Number: 4,945,126

[45] Date of Patent: Jul. 31, 1990

[54] METHODS OF IMPROVING FRICTION AND WEAR PROPERTIES OF POLYMER SYSTEMS

[75] Inventors: Jane M. Crosby, Wilmington, Del.; John E. Theberge, King of Prussia, Pa.

[73] Assignee: ICI Americas Inc., Wilmington, Del.

[21] Appl. No.: 10,032

[22] Filed: Feb. 2, 1987

Related U.S. Application Data

[62] Division of Ser. No. 465,968, Feb. 14, 1983, abandoned, and Ser. No. 774,170, Sep. 9, 1985, abandoned.

[51] Int. Cl.$^5$ .................. C08L 27/18; C08L 23/04; C08L 23/10

[52] U.S. Cl. .................. 524/507; 525/121; 525/146; 525/150; 525/151; 525/154; 525/166; 525/179; 525/185; 525/199; 525/240; 524/508; 524/512; 524/513; 524/514; 524/519; 252/12

[58] Field of Search .............. 427/195; 525/199, 146, 525/154, 151, 166, 179; 252/12; 524/507

[56] References Cited

U.S. PATENT DOCUMENTS

| | | |
|---|---|---|
| 2,691,814 | 10/1954 | Tait ........................... 427/195 |
| 2,855,377 | 10/1958 | Stott . |
| 3,005,795 | 10/1961 | Busse et al. . |
| 3,013,967 | 12/1961 | Rulon-Miller et al. ........... 252/12 |
| 3,050,497 | 8/1962 | Young . |
| 3,125,547 | 3/1964 | Blatz . |
| 3,287,288 | 11/1966 | Reiling . |
| 3,294,871 | 12/1966 | Schmitt et al. . |
| 3,344,064 | 9/1967 | Brady et al. ..................... 252/12 |
| 3,348,995 | 10/1967 | Baker et al. ..................... 427/195 |
| 3,355,520 | 11/1967 | Maloney et al. ................. 525/240 |
| 3,453,208 | 7/1969 | Gallagher et al. ................ 252/12 |
| 3,458,596 | 7/1969 | Faigle . |
| 3,514,308 | 5/1970 | Scott et al. ..................... 427/195 |
| 3,541,011 | 11/1970 | Davis et al. ..................... 252/12 |
| 3,635,876 | 1/1971 | Chameroy . |
| 3,652,409 | 3/1972 | Mack et al. ..................... 252/12 |
| 3,779,918 | 12/1973 | Ikeda et al. ..................... 252/12 |
| 4,001,124 | 1/1977 | Hussey ........................... 252/12 |
| 4,159,286 | 6/1979 | Khattab et al. . |
| 4,220,736 | 9/1980 | Kodera et al. . |

FOREIGN PATENT DOCUMENTS

| | | |
|---|---|---|
| 734562 | 5/1966 | Canada . |
| 752470 | 2/1967 | Canada . |
| 117841 | 9/1975 | Japan . |
| 57-108152 | 7/1982 | Japan . |
| 1014916 | 12/1965 | United Kingdom . |
| 1252204 | 11/1971 | United Kingdom . |

OTHER PUBLICATIONS

Benedyh–"Plastic Bearings: An International Survey" SPE Journal, Apr. 1970–vol. 26, pp. 78–85.

Chem. Abstracts, vol. 80, No. 4, Jan. 28, 1974, p. 52, No. 15874 (Mitsubishi)JP7241093–Abstract 10-17-1972.

Chemical Abstracts of Japan, vol. 79, No. 2, Jul. 16, 1973, p. 49, No. 6231d.

Chemical Abstracts, vol. 80, No. 4, Jan. 28, 1974, p. 52, No. 15874p.

Chemical Abstracts, vol. 97, No. 26, Dec. 27, 1982, p. 54, No. 217424d.

Chemical Abstracts, vol. 95, No. 16, Oct. 19, 1981, p. 49, No. 134012a.

Primary Examiner—Carman J. Seccuro
Attorney, Agent, or Firm—Panitch Schwarze Jacobs & Nadel

[57] ABSTRACT

Lubricant systems are provided in which a polyolefin or polyolefin/polytetrafluoroethylene blend functions as a lubricant in a polymer matrix material. The resulting polymer composites containing about 1 to 30 weight percent of the novel lubricant or lubricant blend have greatly improved friction and wear properties, including lower coefficients of friction and increased surface wear resistance. The polyolefin does not remain as discrete, identifiable particles after mixing with the polymer matrix, and has an average molecular weight of less than 500,000.

19 Claims, No Drawings

METHODS OF IMPROVING FRICTION AND WEAR PROPERTIES OF POLYMER SYSTEMS

This is a division of application Ser. No. 465,968, filed Feb. 14, 1983 and Ser. No. 774,170, filed Sept. 9, 1985, both now abandoned.

BACKGROUND OF THE INVENTION

The present invention relates to polyolefin lubricant systems and polymer composites containing such polyolefin lubricants. More particularly, the invention is directed to the use of polyolefin or polyolefin/polytetrafluoroethylene blends as lubricants in polymer matrices to provide greatly improved friction and wear properties in the polymer composites.

It is known that various solid and liquid lubricants can be dispersed in a polymeric matrix by melt mixing for the purpose of reducing the coefficient of friction, increasing the wear resistance and increasing the limiting pressure velocity (LPV) of the resulting polymer composite. For example, U.S. Pat. No. 2,855,377 teaches that the incorporation of molybdenum disulfide lubricant particles in polyamides results in a lowering of the coefficients of friction. Similarly, U.S. Pat. No. 3,287,288 teaches that the addition of degraded polytetrafluoroethylene particles to a resinous binder, including a variety of thermoplastic polymers, thermosetting polymers and rubbers, reduces the surface friction of the parent plastic material which may be used to form bearings or similar items.

U.S. Pat. No. 3,458,596 teaches that the addition of discrete, identifiable particles of polyolefin having a molecular weight greater than 500,000 to polyamides and polyacetals results in improved wear resistance and lowered coefficients of friction only if discrete particle phases are preserved during processing (melt mixing). As used herein, the term "molecular weight" will be understood by one skilled in the art to mean weight average molecular weight.

To our knowledge, polyolefins having a molecular weight lower than about 500,000 or polyolefins in which the particles do not remain as discrete particles after processing have not previously been recognized as lubricants for polymer matrices or as providing improved friction and wear properties to polymer composites.

BRIEF SUMMARY OF THE INVENTION

According to the present invention, it has been found that a blend of about 2 to 98 weight percent polyolefin and about 98 to 2 weight percent finely divided polytetrafluoroethylene acts as an excellent lubricant providing desirable friction and wear properties to polymer matrix materials. In addition, it has been found that polyolefins alone, when incorporated into polymer matrix materials in such a manner that the polyolefin does not remain as discrete, identifiable particles after melt mixing with the polymer matrix, provides desirable friction and wear properties to the resulting polymer composite. The polyolefin or polyolefin/polytetrafluoroethylene blend lubricants of the present invention are generally added to the polymer matrix in an amount of about 1 to 30 weight percent of the polymer composite. The polymer matrix may comprise any of a wide variety of thermoplastic polymers, thermosetting polymers, rubbers, or elastomers. The lubricant systems of the present invention preferably comprise polyethylene having a molecular weight of less than about 500,000.

DETAILED DESCRIPTION OF THE PREFERRED EMBODIMENTS

In contradistinction to U.S. Pat. No. 3,458,596, we have found that it is not necessary that an introduced polymeric lubricant filler remain in discrete phases throughout the polymer matrix in order to obtain substantial improvements in friction and wear properties. While it is true that high molecular weight polyethylene (i.e., polyethylene having a molecular weight greater than about 500,000) may remain as discrete particles after processing in a polyamide matrix, we have found that lower molecular weight polyolefins also provide substantial improvements in friction and wear properties, even though the lubricant no longer exists as discrete particles in the polymer matrix when the composites are extruded and molded well above the melting point of the polyolefin lubricant. Further, we have observed synergistic lubrication effects from blends of polytetrafluoroethylene and polyolefins of various molecular weights. These lubricant blends were found to be useful in a broad range of polymers and polymer composites.

The polyolefins which are useful as lubricants according to the present invention include, for example, polyethylene, polypropylene and polyolefin copolymers, such as ethylene-propropylene copolymer. The polyolefin may have a molecular weight in the range of about 50,000 up to 500,000, i.e., low molecular weight polyolefins. In any event, as indicated above, the polyolefins selected should not be ones that will remain as discrete, identifiable particles after melt mixing with the polymer matrix or processing of the polymer composite.

The polyethylene may be added to the polymer matrix in any suitable manner which will be evident to those of ordinary skill in the art. For example, the polyolefin may be in the form of a powder or pellets. In the case wheree the polymer matrix is also a polyolefin, a polyolefin lubricant will be selected which is of a different type than the polymer matrix. For example, if the polymer matrix is polypropylene, the lubricant may be polyethylene.

Where the lubricant of the present invention comprises a blend of polyolefin with polytetrafluoroethylene, the polyolefin should comprise about 2 to 98 weight percent of the blend and the polytetrafluoroethylene should comprise about 98 to 2 weight percent of the blend. Preferably, the polyolefin should be in the range of about 20 to 80 weight percent of the blend, and the polytetrafluoroethylene should comprise about 80 to 20 weight percent of the blend.

The polytetrafluoroethylene used in the lubricant blend should be in the form of a finely divided powder having a molecular weight of less than 4,000,000. Normally, polytetrafluoroethylene has a molecular weight in the range of about 4,000,000 to 6,000,000. Therefore, the polytetrafluoroethylene can be degraded or irradiated in order to obtain a fine powder from high molecular weight polytetrafluoroethylene. Low molecular weight polytetrafluoroethylene resins are also suitable. The polyolefin and polytetrafluoroethylene may be either blended prior to mixing with the polymer matrix or may be added separately to the polymer matrix and thoroughly blended with the polymer matrix.

The lubricant systems of the present invention may be added to polymer matrices in an amount of about 1 to 30 weight percent and preferably about 15 to 20 weight percent of the total polymer composite. Since polyolefins are much less expensive than polytetrafluoroethylene, it is desirable to replace as much of the polytetrafluoroethylene with polyolefin as possible.

The lubricant systems of the present invention may be used with a wide variety of polymer matrices, including thermoplastic polymers, thermosetting polymers, rubbers, and elastomers. Examples of such polymer matrices include polyamides, such as polyhexamethylene adipamide, polyhexamethylene sebacamide, polycaprolactam, polycapryllactam, polyhexamethylene dodecanamide, polyhexamethylene azeleamide, polyundecanoamide, polylauryllactam, polyamide modified with carboxylic acids and olefin copolymer and blends of the above; polyesters, including polyalkylene terephthalates, such as polyethylene terephthalate and polybutylene terephthalate, polyalkylene terephthalate copolymers, such as the segmented polyether-ester copolymer derived from the condensation of dimethyl terephthalate, polytetramethylene ether glycol, 1,4-butanediol and blends of the above polyesters; polyoxymethylene, including homopolymers or copolymers thereof; polyphenylene sulfide; aromatic carbonate polymers, in particular the polycarbonate resin based on Bisphenol-A and phosgene; styrenic polymers and copolymers including polystyrene; poly-α-methyl-styrene, acrylonitrile-butadiene-styrene, styrene-butadiene-styrene, acrylonitrile-styrene, styrene-maleic anhydride, styrenemaleic anhydride-methacrylate, and styrenic alloys with poly-2,6-dimethyl-1,4-phenylene ether; polyolefins, such as polyethylenes, polypropylenes and polyolefin copolymers such as ethylenepropylene copolymers; polyurethane, such as linear thermoplastic polyurethane; thermosetting polyesters; thermosetting polyimides; phenolics; epoxies; ureas; melamines; furans; etc.

In addition to the lubricant systems of the present invention, the polymer composites may also include other additives, including fillers, such as mica, wollastonite, talc, calcium carbonate, etc; reinforcing agents, such as glass fibers, graphite fibers, aramid fibers, etc; and additional lubricants, such as molybdenum disulfide, graphite powder, silicone fluid, etc. Other conventional additives for polymer composites will be readily apparent to those of ordinary skill in the art.

The lubricated composites of the present invention may be used in the same types of applications as other lubricated polymer composites of the prior art, including numerous situations where the surface of the composite bears against another surface, including plastic-plastic surface contact, plastic-metal surface contact, etc. It hs been found according to the present invention that the lubricated composites of the present invention have greatly improved friction and wear properties in such situations, including lower coefficients of friction, increased surface wear resistance and increased limiting pressure velocity (LPV). Moreover, while the above description is primarily directed to the concept of using the lubricant systems of the present invention as an internal lubricant for the polymer matrix, the lubricating systems of the present invention may also be used as lubricants for impregnating metal surfaces, for example, in much the same way as polytetrafluoroethylene powder is often used to impregnate metal surfaces for lubricating purposes.

The present invention will now be illustrated in more detail by reference to the following specific, non-limiting examples. Unless otherwise indicated, all percentages are by weight.

EXAMPLE 1

Polycarbonate composites were prepared by melt mixing 15% of a polytetrafluoroethylene lubricant powder (LNP TL-140) and a blend of 8% polytetrafluoroethylene lubricant (LNP TL-140) with 7% of a low density polyethylene powder (USI Microthene MN703-06). In the case of the blend the polytetrafluoroethylene and polyethylene polymers were cryogenically milled and blended together prior to melt-mixing. Each mixture of polycarbonate resin and lubricant was fed to an extruder, and the extrudate was comminuted into pellets. The pellets were injection molded into the appropriate wear specimen. The specimen is a 1" radius disc with a thickness of about ⅛" and having an annular ridge on one surface.

The friction and wear testing of these specimens was conducted on a modified drill press in accordance with the "thrust washer" test method (LNP #1). Wear factors (volumetric weight loss measured in units of $10^{-10}$ in$^3$min/ft.lb.hr for each compound were based on equilibrium wear rates independent of break-in wear. The wear test is conducted at 40 psi, 50 ft/min at room temperature and against a mating metal surface of cold-rolled carbon steel. After thermal equilibrium occurs, the frictional torque generated is measured with a torque arm mounted on an anti-friction bearing on the lower sample holder in the "thrust washer" test apparatus. The results of the friction and wear testing indicate that a substantial improvement in wear resistance and a reduced coefficient of friction can be achieved with the addition of polytetrafluoroethylene lubricant. However, the blend of 7% polyethylene and 8% polytetrafluoroethylene lubricant results in a still greater improvement in wear resistance and reduction in coefficient of friction as illustrated in the table below:

|  | Wear Factor $10^{-10}$ in$^3$ min ft. lb. hr. | Coefficient of Friction | |
| --- | --- | --- | --- |
|  |  | $\mu S$ | $\mu D$ |
| Polycarbonate Resin | 2500 | 0.31 | 0.38 |
| Polycarbonate with 15% Polytetrafluoroethylene Lubricant | 75 | 0.09 | 0.15 |
| Polycarbonate with 8% Polytetrafluoroethylene and 7% Polyethylene Lubricant | 43 | 0.06 | 0.11 |

EXAMPLE 2

Styrene maleic anhydride copolymer composites were prepared by melt mixing the resin (Arco Dylark 700), glass fiber reinforcement (PPG 3130), and lubricant in an extruder. Specimens were prepared and tested as in Example 1. The polytetrafluoroethylene lubricant was LNP TL-115A and the polyethylene was ARCO Dylan 2010F cryogenically milled and blended prior to melt-mixing. The addition of polytetrafluoroethylene lubricant to styrene-maleic anhydride copolymer results in a significant improvement in wear resistance and reduction in coefficient of friction. A greater improvement in wear resistance and reduction in coefficient of friction is achieved with the lubricant blend of polytetrafluoroethylene and polyethylene. A significant reduction in mating metal surface wear was also noted with the lubricant blend as illustrated below:

|  | Wear Factor $10^{-10}$ in$^3$ min ft. lb. hr | Coefficient of Friction | | Wear Factor of Mating Steel Surface $10^{-10}$ in$^3$ min ft. lb. hr |
|---|---|---|---|---|
|  |  | $\mu S$ | $\mu D$ |  |
| Styrene-Maleic Anhydride Copolymer Resin | 3000 | 0.28 | 0.32 | — |
| Styrene-Maleic Anhydride Copolymer with 30% Glass Fiber Reinforcement and 15% Polytetrafluoroethylene Lubricant | 178 | 0.20 | 0.17 | 24 |
| Styrene-Maleic Anhydride Copolymer with 30% Glass Fiber Reinforcement and 3% Polytetrafluoroethylene and 12% Polyethylene | 65 | 0.16 | 0.17 | 0.3 |

EXAMPLE 3

Polyacetal copolymers (Celanese Celcon M-90) yield low coefficients of friction and good wear resistance. The addition of 20% low density polyethylene (USI Microthene MN-703-6) results in a further decrease in coefficient of friction and improved wear resistance. The polyolefin lubricated composites offer lower coefficients of friction and greater wear resistance than 20% polytetrafluoroethylene (LNP TL-140) lubricated polyacetal copolymer composites, as illustrated by the following test results:

|  | Wear Factor $10^{-10}$ in$^3$ min ft. lb. hr | Coefficient of Friction | |
|---|---|---|---|
|  |  | $\mu S$ | $\mu D$ |
| Polyacetal Copolymer | 65 | 0.14 | 0.21 |
| Polyacetal Copolymer with 20% Polytetrafluoroethylene Lubricant | 14 | 0.07 | 0.15 |
| Polyacetal Copolymer with 20% Low Density Polyethylene Lubricant | 9.5 | 0.07 | 0.11 |

EXAMPLE 4

Polyphenylene sulfide composites were prepared by melt-mixing resin (Phillips Ryton P4), graphite fiber (Celanese C6), and lubricant in an extruder. Specimens were prepared and tested as in Example 1. The polytetrafluroethylene lubricant was LNP TL-140 and the polyethylene lubricant was ARCO Dylan 2010F, cryogenically milled and blended prior to melt-mixing. The addition of graphite fiber results in significant improvements in wear resistance and reduced coefficient of friction. The addition of polytetrafluoroethylene lubricant in graphite fiber reinforced composites results in further improvements in wear resistance and reductions in the coefficient of friction. The composite prepared with graphite fiber and a 3% polytetrafluroethylene/12% polyethylene lubricant blend demonstrates an additional significant improvement in wear resistance and reduction in the coefficient of friction, as shown in the table below:

|  | Wear Factor $10^{-10}$ in$^3$ min ft. lb. hr | Coefficient of Friction | |
|---|---|---|---|
|  |  | $\mu S$ | $\mu D$ |
| Polyphenylenesulfide Resin | 540 | 0.30 | 0.24 |
| Polyphenylenesulfide with 30% Carbon Fiber Reinforcement | 160 | 0.23 | 0.20 |
| Polyphenylenesulfide with 30% Graphite Fiber Reinforcement and 15% Polytetrafluoroethylene Lubricant | 75 | 0.16 | 0.15 |
| Polyphenylenesulfide with 30% Graphite Fiber Reinforcement, 3% Polytetrafluoroethylene and 12% Polyethylene | 12.5 | 0.18 | 0.17 |

EXAMPLE 5

Polypropylene composites were prepared by melt-mixing resin (Hercules Profax PC072), glass fiber reinforcement (OCF 497) and lubricant (as in Example 2) in an extruder. Specimens were prepared and tested as in Example 1. The addition of lubricant blend to polypropylene results in a greater improvement in composite wear resistance and lower coefficients of friction than the polytetrafluoroethylene lubricant alone. A significant reduction in mating surface wear was also observed in the lubricant blend system, as shown below:

|  | Wear Factor $10^{-10}$ in$^3$ min ft. lb. hr | Coefficient of Friction | | Wear Factor of Mating Steel Surface $10^{-10}$ in$^3$ min ft. lb. hr |
|---|---|---|---|---|
|  |  | $\mu S$ | $\mu D$ |  |
| Chemically Coupled Polypropylene Homopolymer with 30% Glass Fiber Reinforcement and 15% Polytetrafluoroethylene Lubricant | 178 | 0.20 | 0.17 | 24 |
| Chemically coupled Polypropylene Homopolymer with 30% Glass Fiber Reinforcement and 3% Polytetrafluoroethylene and 12% Polyethylene Lubricant | 65 | 0.16 | 0.17 | 0.07 |

EXAMPLE 6

Polycarbonate composites were prepared by melt-mixing resin (Mobay Merlon M50) and lubricant (the polytetrafluoroethylene lubricant used was LNP TL-156; the polyethylene was cryogenically ground ARCO Dylan 2010F) in an extruder. Samples were prepared and tested on the thrust washer test apparatus described in Example 1, but test conditions were changed to 1.2 psi and 50 fpm, and the test material was run against a polybutylene terephthalate (Valox 325) mating surface.

Polymer-polymer mated surfaces are known to generate catastrophic wear conditions. Polytetrafluoroethylene lubricant is commonly used to reduce wear rates in these instances. It was demonstrated that a lubricant blend of polytetrafluoroethylene and polyethylene provides significantly greater reductions in mating plastic wear than polytetrafluoroethylene lubricant alone, as shown below:

|  | Wear Factor of Mating PBT Wear Washer $10^{-10}$ in$^3$ min ft. lb. hr. |
| --- | --- |
| Bisphenol-A Polycarbonate with 10% Polytetrafluoroethylene Lubricant | 134 |
| Bisphenol-A Polycarbonate with 6% Polytetrafluoroethylene and 4% Polyethylene Lubricant | 93 |

EXAMPLE 7

Limiting pressure velocity (LPV) is generated in a Faville-LeValley LFW5 test apparatus. A cylindrical journal bearing sample typically ¾"ID×¾" long×1/16" wall, is installed in an anti-friction bearing mounted in the test apparatus. The anti-friction bearing holder is equipped with a torque arm. Load is applied through the anti-friction bearing to the test bearing. The shaft was rotated at the two test velocities of 100 fpm and 800 fpm. At each test velocity a load-stepping test is conducted. Frictional torque and bearing temperature, which are plotted continuously, are allowed to reach equilibrium at each loading. The equilibrium condition is maintained for approximately 30 minutes, then the load is increased. At an advanced load increment, the frictional torque and/or bearing temperature will not stabilize. The increase in torque or temperature will result in bearing failure. Neat polyamide 6/6 resin (Monsanto Vydyne 21) yielded a very low value of 3,000 psi·fpm at the 100 fpm test velocity. The addition of 30% glass fiber reinforcement (PPG 3540) resulted in an increase in LPV to 12,500 psi fpm.

The addition of 15% polytetrafluoroethylene lubricant (LNP TL-156) and 30% glass fiber reinforcement to the polyamide 6/6 resin results in a further increase in the limiting pressure velocity to 17,000 psi·fpm at the 100 fpm test velocity.

However, the addition of 30% glass fiber reinforcement, 3% polytetrafluoroethylene and 12% polyethylene lubricant to the polyamide 6/6 resin results in a composite yielding a limiting pressure velocity of 23,000 psi·fpm at the 100 fpm test velocity. A large increase in limiting pressure velocity is also noted at the 800 fpm test velocity. (See table below.) These large increases in limiting pressure velocity demonstrate the usefulness of this lubricant blend as an additive in plastic materials for bearing applications.

|  | Limiting Pressure Velocity (LPV) (psi · fpm) | |
| --- | --- | --- |
|  | 100 fpm | 800 fpm |
| Polyamide 6/6 Resin | 3,000 | 2,500 |
| Polyamide 6/6 Resin with Glass Fiber Reinforcement | 12,500 | 8,000 |
| Polyamide 6/6 Resin with 30% Glass Fiber Reinforcement and 15% Polytetrafluoroethylene Lubricant | 17,000 | 13,000 |
| Polyamide 6/6 Resin with 30% Glass Fiber Reinforcement and 3% Polytetrafluoroethylene and 12% Polyethylene Lubricant | 23,000 | 21,000 |

The present invention may be embodied in other specific forms without departing from the spirit or essential attributes thereof and, accordingly, reference should be made to the appended claims, rather than to the foregoing specification, as indicating the scope of the invention.

We claim:

1. In a method of making a plastic-plastic or plastic-metal wear system wherein the surface of a polymer composite bears against another surface causing friction and wear of the polymer composite, the improvement comprising improving the wear resistance and lowering the coefficients of friction of said composite by melt mixing of a polymer matrix and about 1 to 30 weight percent, based on the total composite, of a lubricant comprising a blend of about 2 to 98 weight percent polyolefin having a weight average molecular weight of about 50,000 to about 500,000 and about 98 to 2 weight percent finely divided polytetrafluoroethylene, to form said composite in which said polyolefin does not remain as discrete, identifiable particles after melt mixing with said polymer matrix, and said matrix is not the same as the polyolefin in the lubricant.

2. A method according to claim 1 wherein said polyolefin is selected from the group consisting of polyethylene, polypropylene and ethylene copolymers.

3. A method according to claim 1 wherein said polytetrafluoroethylene has a weight average molecular weight of less than about 4,000,000.

4. A method according to claim 1 wherein said blend comprises about 20 to 80 weight percent polyolefin and about 80 to 20 weight percent finely divided polytetrafluoroethylene.

5. A method according to claim 1 wherein said polyolefin and said polytetrafluoroethylene are blended prior to incorporation into the polymer matrix.

6. A method according to claim 1 wherein said polymer matrix is selected from the group consisting of thermoplastic polymers and thermosetting polymers.

7. A method according to claim 1 wherein said polymer matrix comprises a thermoplastic polymer selected from the group consisting of polyamides, polyesters, polyoxymethylene, polyphenylene sulfide, aromatic carbonate polymer, styrene homopolymers and copolymers, polyolefins and polyurethanes.

8. A method according to claim 1 wherein said polymer matrix comprises a polyamide selected from the group consisting of polyhexamethylene adipamide, polyhexamethylene sebacamide, polycaprolactam, polycapryllactam, polyhexamethylene dodecanamide, polyhexamethyl azeleamide, polyundecanoamide, polylauryllactam, polyamide modified with carboxylic acids and olefin copolymer, and blends of the above polyamides.

9. A method according to claim 1 wherein said polymer matrix comprises a polyester selected from the group consisting of polyalkylene terephthalates, polyalkylene terephthalate copolymers of the polyether-ester type, and mixtures thereof.

10. A method according to claim 1 wherein said polymer matrix comprises a polyoxymethylene homopolymer or copolymer.

11. A method according to claim 1 wherein said polymer matrix comprises an aromatic carbonate polymer in which the polycarbonate resin is based on Bisphenol-A and phosgene.

12. A method according to claim 1 wherein said polymer matrix comprises a styrene homopolymers or copolymer selected from the group consisting of polystyrene, poly-α-methyl styrene, acrylonitrile-butadiene-styrene, styrene-butadiene styrene, acrylonitrile-styrene, styrene-maleic anhydride, styrene-maleic anhydride-methacrylate, and styrenic alloys with poly,2-6-dimethyl-1,4-phenylene ether.

13. A method according to claim 1 wherein said polymer matrix comprises a polyolefin of a different type than the polyolefin which comprises the lubricant, said polyolefin matrix being selected from the group consisting of polyethylene, polypropylene and polyolefin copolymers.

14. A method according to claim 1 wherein said polymer matrix comprises a linear thermoplastic polyurethane.

15. A method according to claim 1 wherein said polymer matrix is selected from the group consisting of thermosetting polyesters, thermosetting polyimides, phenolics, epoxies, ureas, melamines and furan.

16. A method according to claim 1 wherein said polymer composite also contains a filler.

17. A method according to claim 1 wherein said composite also contains a reinforcing agent.

18. A method according to claim 1, wherein said polymer matrix is a rubber.

19. A method according to claim 1, wherein said polymer matrix is an elastomer.

* * * * *